United States Patent
Mo et al.

(10) Patent No.: US 9,888,421 B2
(45) Date of Patent: Feb. 6, 2018

(54) METHOD OF ENHANCED BEARER CONTINUITY FOR 3GPP SYSTEM CHANGE

(71) Applicant: MEDIATEK INC., Hsinchu (TW)

(72) Inventors: Shang-Ru Mo, Kaohsiung (TW); Chien-Chun Huang-Fu, Hsinchu (TW); Yuan-Chieh Lin, Taipei (TW); Yung Hsiang Hsieh, New Taipei (TW); Yung-Fu Chen, New Taipei (TW)

(73) Assignee: MEDIATEK INC., HsinChu (TW)

( * ) Notice: Subject to any disclaimer, the term of this patent is extended or adjusted under 35 U.S.C. 154(b) by 118 days.

(21) Appl. No.: 14/854,369

(22) Filed: Sep. 15, 2015

(65) Prior Publication Data

US 2016/0080978 A1 Mar. 17, 2016

Related U.S. Application Data

(60) Provisional application No. 62/050,843, filed on Sep. 16, 2014.

(51) Int. Cl.
*H04W 36/00* (2009.01)
*H04W 36/24* (2009.01)
(Continued)

(52) U.S. Cl.
CPC .......... *H04W 36/24* (2013.01); *H04W 36/14* (2013.01); *H04W 76/041* (2013.01); *H04W 48/20* (2013.01)

(58) Field of Classification Search
CPC .................................................. H04W 36/24
(Continued)

(56) References Cited

U.S. PATENT DOCUMENTS 6,987,779 B1 1/2006 Sevanto et al. ............... 370/469
8,837,405 B2 * 9/2014 Chilla ............... H04W 36/0066
370/329
(Continued)

FOREIGN PATENT DOCUMENTS

CN 101355792 A 1/2009
CN 102415149 A 4/2012
(Continued)

OTHER PUBLICATIONS

International Search Report and Written Opinion of International Search Authority for PCT/CN2015/089798 dated Dec. 23, 2015(11 pages).

(Continued)

*Primary Examiner* — Mang Yeung
*Assistant Examiner* — Peter G Solinsky
(74) *Attorney, Agent, or Firm* — Imperium Patent Works; Zheng Jin; Helen Mao (57) ABSTRACT

Methods and apparatus are provided for enhanced bearer continuity for the 3GPP network. In one novel aspect, the UE detects missing parameters for the inter-RAT bearer change in an idle state. The UE performs bearer preservation procedures to maintain the bearer continuity. In one embodiment, predefined/preconfigured parameter settings are used. In one embodiment, a mapping rule is used to map the missing parameter to a predefined value based on one or more known parameters. In another embodiment, the missing parameters are obtained from the network. In another embodiment, signaling procedures used to obtain the missing parameters. The signaling procedures include a service request, a UE-initiated bearer modification procedure. In one embodiment, the cell reselection is suspended such that the signaling procedure is performed to obtain the missing parameters before the cell reselection. In another embodi- (Continued)

ment, a RAU procedure is used upon detecting the missing of parameters.

20 Claims, 9 Drawing Sheets

(51) Int. Cl.
    *H04W 36/14* (2009.01)
    *H04W 76/04* (2009.01)
    *H04W 48/20* (2009.01)

(58) Field of Classification Search
    USPC .......................................................... 370/331
    See application file for complete search history.

(56) References Cited

U.S. PATENT DOCUMENTS

| | | |
|---|---|---|
| 2003/0060210 A1 | 3/2003 | Ravishankar et al. ..... 455/452.1 |
| 2004/0092286 A1 | 5/2004 | Stattin et al. .............. 455/552.1 |
| 2005/0281269 A1 | 12/2005 | Choi ........................... 370/395.2 |
| 2008/0176564 A1 | 7/2008 | Eerolainen .................... 455/436 |
| 2008/0304450 A1 | 12/2008 | Rexhepi et al. ............. 370/331 |
| 2009/0129342 A1 | 5/2009 | Hwang et al. ................ 370/331 |
| 2009/0247161 A1* | 10/2009 | Pani ................ H04W 36/0072 455/435.3 |
| 2009/0316656 A1* | 12/2009 | Zhao .................... H04W 28/22 370/331 |
| 2010/0048210 A1 | 2/2010 | Iwamura et al. ............ 455/436 |
| 2010/0118970 A1 | 5/2010 | Guo et al. .................... 370/328 |
| 2010/0323696 A1 | 12/2010 | Cherian et al. ............ 455/435.2 |
| 2011/0009124 A1 | 1/2011 | Kostic .......................... 455/450 |
| 2011/0235614 A1* | 9/2011 | Lerzer ................ H04W 76/021 370/331 |
| 2011/0281570 A1 | 11/2011 | Shi et al. ...................... 455/418 |
| 2011/0310844 A1 | 12/2011 | Rexhepi ....................... 370/331 |
| 2012/0015650 A1 | 1/2012 | Pudney et al. ................ 455/434 |
| 2012/0094627 A1 | 4/2012 | Suh et al. ................... 455/404.1 |
| 2012/0172042 A1 | 7/2012 | Drevon et al. ............... 455/436 |
| 2012/0246325 A1* | 9/2012 | Pancorbo Marcos ...................... H04L 12/2602 709/227 |
| 2013/0070679 A1 | 3/2013 | Wegmann et al. ........... 370/328 |
| 2013/0150024 A1 | 6/2013 | Burbidge et al. ............. 455/423 |
| 2013/0150032 A1 | 6/2013 | Pattaswam et al. .......... 455/434 |
| 2013/0242727 A1 | 9/2013 | Shaikh .......................... 370/230 |
| 2013/0258998 A1 | 10/2013 | Ramachandran et al. .... 370/331 |
| 2013/0267231 A1 | 10/2013 | Aoyagi et al. ................ 455/436 |
| 2013/0308527 A1 | 11/2013 | Chin et al. .................... 370/328 |
| 2014/0016614 A1* | 1/2014 | Velev .................... H04W 4/005 370/331 |
| 2014/0078898 A1* | 3/2014 | Anchan ............. H04W 28/0268 370/230 |
| 2014/0160983 A1 | 6/2014 | Dominguez Romero et al. ............................. 370/254 |
| 2015/0117320 A1* | 4/2015 | Wang .................. H04L 12/1407 370/329 |
| 2017/0048780 A1* | 2/2017 | Qi ......................... H04W 36/24 |

FOREIGN PATENT DOCUMENTS

| | | |
|---|---|---|
| CN | 102892210 A | 1/2013 |
| CN | 103916908 A | 7/2014 |
| EP | 2637449 A1 | 9/2013 |
| WO | WO2010138634 A2 | 12/2010 |

OTHER PUBLICATIONS

International Search Report and Written Opinion of International Search Authority for PCT/CN2015/089797 dated Dec. 23, 2015(11 pages).
USPTO, Office Action for related U.S. Appl. No. 14/854,413 dated Apr. 3, 2017 (18 pages).

* cited by examiner

METHOD OF ENHANCED BEARER CONTINUITY FOR 3GPP SYSTEM CHANGE

CROSS REFERENCE TO RELATED APPLICATIONS

This application claims priority under 35 U.S.C. § 119 from U.S. Provisional Application No. 62/050,843, entitled, "Method of Enhanced Bearer Continuity for 3GPP System Change" filed on Sep. 16, 2014; the subject matter of which is incorporated herein by reference.

TECHNICAL FIELD

The disclosed embodiments relate generally to wireless communication, and, more particularly, to methods of enhanced bearer continuity for 3GPP system change.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). The $3^{rd}$ generation partner project (3GPP) network normally includes a hybrid of 2G/3G/4G systems. With the optimization of the network design, many improvements have developed over the evolution of various standards. In the 3GPP network where multiple radio access technology (RAT) systems are supported simultaneously, the UE may perform inter-RAT changes. Issues arise when mismatches are found among different systems supported by the same network.

One of the problem is the inter-RAT bearer changes. In the LTE/4G system, the activation of the EPS bearer has less mandatory parameters than the 3G/2G PDP context. Upon inter-RAT bearer changes, if the optional parameters are not presented in the EPS bearer, problems occurs in the new PDP context set up because those parameters are mandatory for the PDP context. In some scenarios, upon detecting the missing of mandatory parameters, the inter-RAT bearer change is terminated. In other scenarios, the behavior was not even defined.

Improvement and enhancement are required for inter-RAT bearer change procedures.

SUMMARY

Methods and apparatus are provided for enhanced bearer continuity for the 3GPP network. In one novel aspect, the UE detects missing parameters for the inter-RAT bearer change. The UE performs bearer preservation procedures to maintain the bearer continuity. In one embodiment, predefined/preconfigured parameter settings are used. In another embodiment, the missing parameters are obtained from the network. In yet another embodiment, signaling procedures are modified/designed to obtain the missing parameters. In one embodiment, the predefined parameter sets are obtained locally from the UE. In another embodiment, mapping rules are used to obtain the missing parameter by mapping the missing parameter with a value based on a known parameter. In one embodiment, the network provisionally configures the missing parameters upon detecting that multiple RATs are supported by the 3GPP network. Corresponding parameters are conditionally provisioned to the UE such that the bearer continuity can be maintained. In yet another embodiment, the Service Request procedure is used by the UE. The UE triggers the Service Request procedure to request the missing parameters from the network. In one embodiment, the triggering event is detecting an inter-RAT cell reselection. The one or more missing parameters are obtained using a network initiated PDP context modification procedure for the 3G RAT, or the network initiated EPS bearer context modification procedure for the 4G RAT. In one embodiment, the MS-initiated PDP context modification procedure for the 3G RAT or the MS-initiated EPS bearer context modification procedure for the 4G RAT is used to obtain the missing parameters from the network. In another embodiment, the RAU procedure is used to obtain the missing parameters.

In another novel aspect, a bearer termination procedure is performed upon detecting one or more triggering events for the inter-RAT bearer modification. In one embodiment, the UE established the 4G EPS bearer. The UE successfully performs a bearer change from 4G to 3G. Subsequently, the UE detects missing mandatory parameters during inter-RAT bearer change from 3G to 2G in an idle state. The UE performs bearer termination by releasing the PDP context.

In one embodiment, the PDP context is locally released. In other embodiments, the UE explicitly releases bearer using the PDP context deactivation procedure. The locally released procedure can be triggered by the UE, or by the network, or by both the UE and the network. The explicitly PDP context release procedure can be triggered by the UE, or by the network, or by both the UE and the network.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
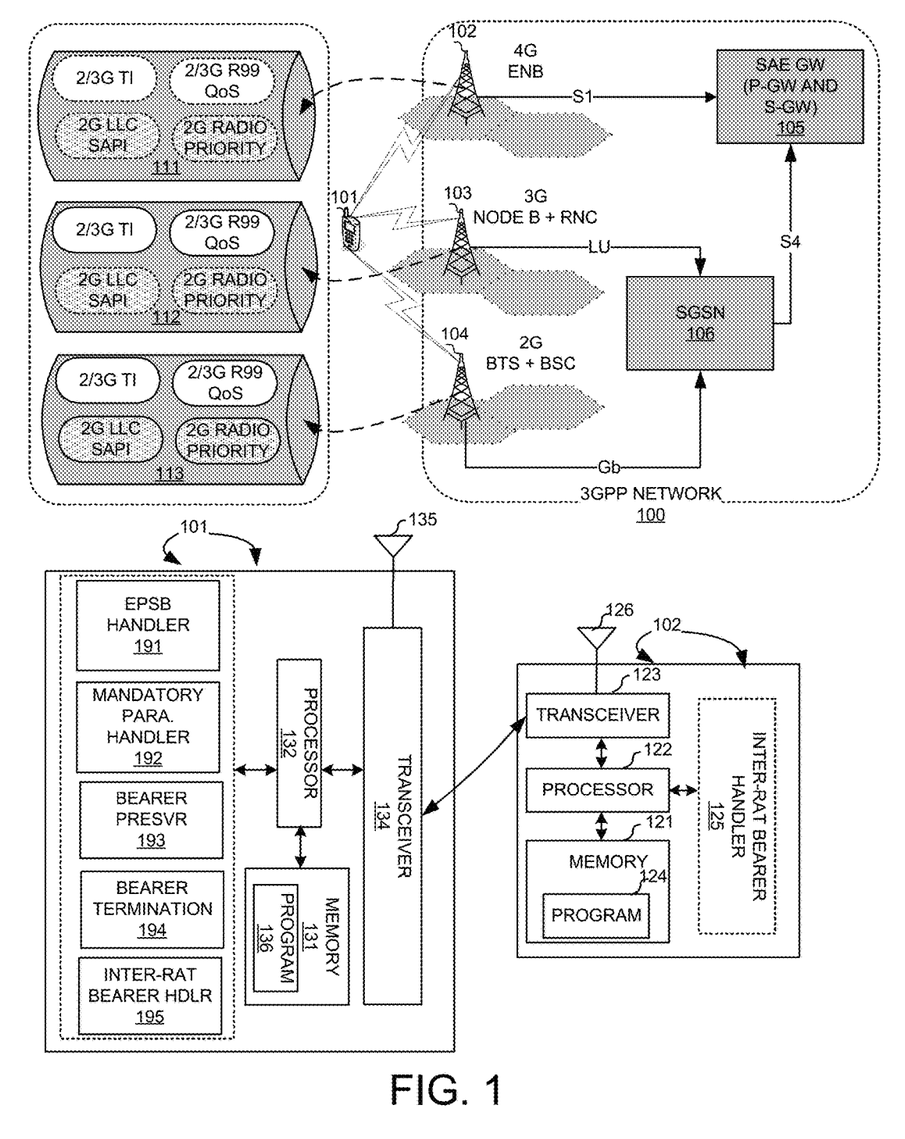
FIG. 1 illustrates an exemplary 3GPP wireless network with enhanced bearer continuity for 3GPP system change in accordance with embodiments of the current invention.

FIG. 1 illustrates an exemplary 3GPP wireless network 100 with enhanced bearer continuity for 3GPP system change in accordance with embodiments of the current invention. 3GPP system 100 supports one or more wireless radio network access (RAT) networks, such a 4G/LTE system, a 3G system and a 2G system. Each of the 3GPP system has a fixed base infrastructure unit, such as wireless communications stations 102 103, and 104, forming wireless networks distributed over a geographical region. The base unit may also be referred to as an access point, an access terminal, a base station, a Node-B, an eNode-B, or by other terminology used in the art. Each of the receiving wireless communications stations 102, 103, and 104 serves a geographic area. A 4G/LTE system has a evolved node-B (eNB) 102 connecting with a system architecture evolution (SAE) gateway 105, which includes the serving gateway (S-GW) and the packet data network (PDN) gateway (P-GW) via the S1 interface. A 3G system has a node-B 103 and a radio network controller (RNC). The RNC of the 3G system connects via the Iu interface with a serving GPRS support node (SGSN) 106, which is connected to SAE gateway 106. A 2G system has a base transceiver station (BTS) 104 and a base station controller (BSC). The BSC of the 2G system connects with SGSN 106 via the Gb interface.

A wireless communications device/user equipment (UE) 101 in 3GPP wireless network 100 can be served by eNB 102, or by node-B 103 or by BTS/BSC 104. UE 101 establishes a bearer with 3GPP system 100. UE 101 establishes EPS bearer in the 4G system via the S1 interface, or establishes a PDP context in the 3G system via the Iu interface, or establishes a PDP context in the 2G system via the Gb interface. When UE 101 is served in a 3GPP system that supports multiple RATs, UE 101 may need to perform inter-RAT bearer change. Different RATs are configured with different parameters for bearer activation. For example, for the EPS bearer established in the 4G system, several parameters are optional as shown in a parameter set 111. The transaction identifier (TI), which is used in both the 2G and the 3G system, is optional for the EPS bearer setup in the 4G/LTE system. The negotiated QoS (R99 QoS), which is used in both 2G and 3G systems, is also optional for the EPS bearer. Similarly, the negotiated LLC SAPI and the radio priority, which are both used in the 2G system, are both optional for the 4G EPS bearer activation. Therefore, it is possible that when the EPS bearer is activated in the 4G/LTE system, one or more of the parameters, the TI, the R99 QoS, the LLC SAPI, and the radio priority, are omitted. If the bearer is first established in the 3G or 2G system, the above parameters including TI, the R99 QoS, the LLC SAPI, and the radio priority, are all mandatory. However, if a bearer is changed from a 4G system to a 3G system, the parameters of the LLC SAPI and the radio priority is optional. Therefore, a 3G transferred bearer parameter set 112 has the LLC SAPI, and the radio priority as optional. It is possible that when a PDP context is activated in the 3G system via bearer change from the 4G system, one or more of the parameters of the LLC SAPI and the radio priority is omitted. A parameter set 113 of the 2G system has all parameters listed as mandatory including the TI, the R99 QoS, the LLC SAPI, and the radio priority.

In one novel aspect, UE 101 performs a bearer preservation procedure to maintain the continuity of the bearer for inter-RAT bearer change. In one embodiment, the bearer preservation procedure is performed if one or more mandatory parameters are missing when the UE changes bearer from the 4G system to the 3G system, or when the UE changes bearer from the 4G system to the 2G system. In yet another embodiment, when the UE changes from the 4G system to the 3G system omitting at least one parameter including the LLC SAPI and the radio priority, the bearer preservation procedure is performed when subsequently, the UE changes from the 3G to the 2G system in an idle state.

In another novel aspect, the UE performs the bearer termination procedure when the UE changes from the 4G system to the 3G system omitting at least one parameter including the LLC SAPI and the radio priority and subsequently changes from the 3G to the 2G system. The bearer termination procedure is performed either through local release of the PDP context or through the explicit PDP context deactivation procedure.

FIG. 1 further shows simplified block diagrams of UE 101 and eNB 102 in accordance with the current invention. The block diagram of eNB 102 is also applicable to node-B 103 in the 3G system or the BTS/BSC 104 in the 2G system.

eNB 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules, such as inter-RAT bearer handler 125 that carry out functional tasks for enhanced bearer continuity features in the 3GPP network.

UE 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

UE 101 also includes a set of control modules that carry out functional tasks. An EPS bearer handler 191 establishes a 4G bearer connection in the 3GPP system. A mandatory parameter handler 192 determines whether one or more mandatory parameters are missing for an inter-RAT change of bearer. A bearer preservation handler 193 maintains the bearer continuity of the bearer for the inter-RAT change of bearer. A bearer termination handler 194 releases a PDP context upon detecting one or more predefined conditions. An inter-RAT bearer handler 195 that handles inter-RAT bearer changes, such as performs an inter-RAT bearer change from a 4G system to a 3G system and subsequently attempts an inter-RAT bearer change from the 3G system to a 2G system in an idle state.

Figure 2:
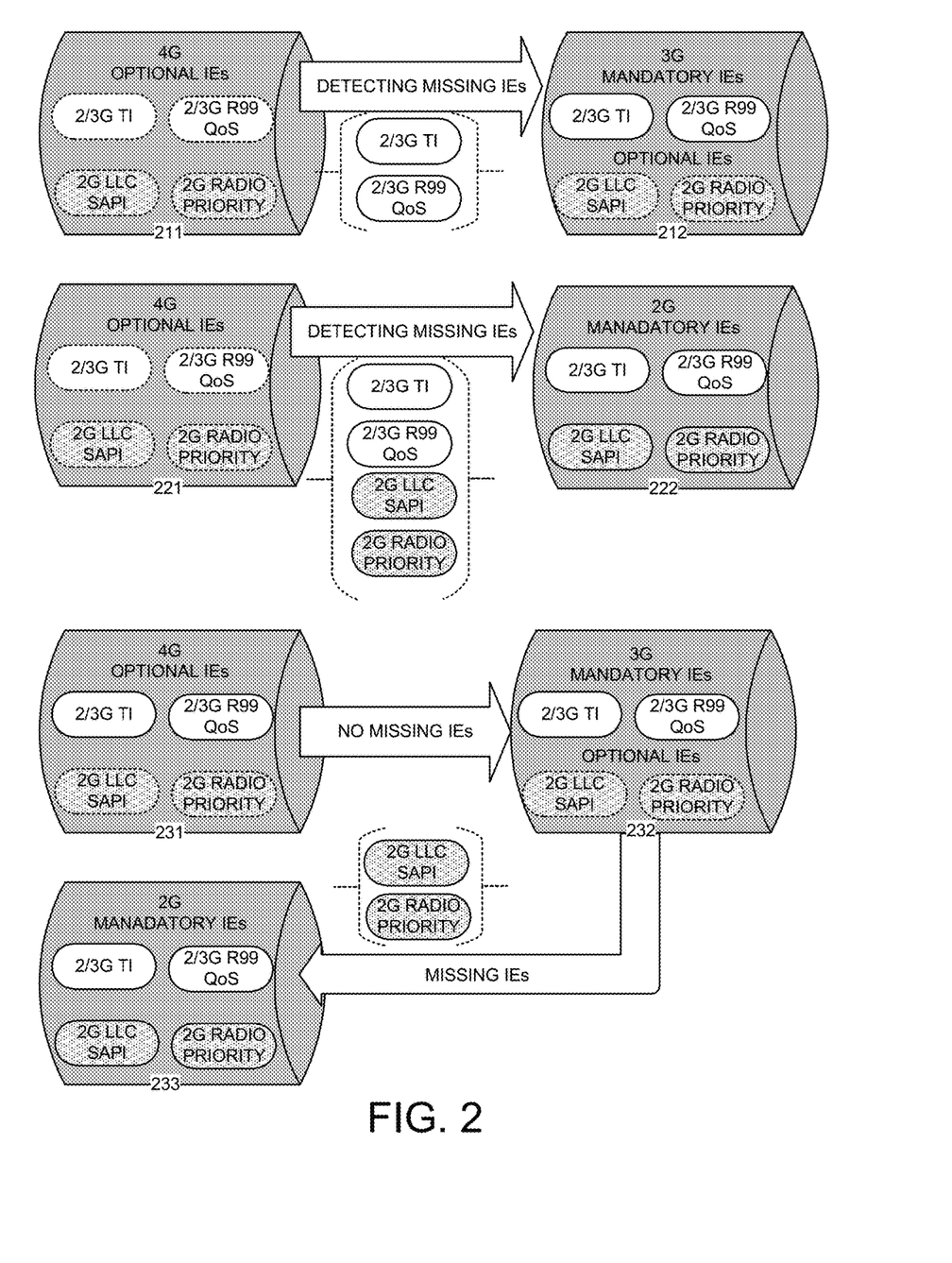
FIG. 2 illustrates an exemplary detailed diagram in a 3GPP wireless network when mandatory IEs/parameters are missing during inter-RAT bearer change in accordance with embodiments of the current invention.

FIG. 2 illustrates an exemplary detailed diagram in a 3GPP wireless network when mandatory IEs/parameters are missing during inter-RAT bearer change in accordance with embodiments of the current invention. In the first scenario, the EPS bearer is first activated in the 4G system. An inter-RAT bearer change is attempted to change the bearer to the 3G system. A parameter set 211 for the 4G system has four parameters, the TI, the R99 QoS, the LLC SAPI, and the radio priority, all being optional. To transfer the bearer to the 3G system, parameter set 212 for the 3G system requires the TI and the R99 QoS to be mandatory while having the LLC SAPI, and the radio priority as optional. Therefore, in the inter-RAT bearer change procedure, the UE may detect missing parameters/missing IEs if 4G parameter set 211 does not include any one of the optional parameters of the TI and the R99 QoS. If the missing parameter is detected, a bearer preservation procedure is performed to keep the bearer continuity.

Similarly, in the second scenario, the EPS bearer is first activated in the 4G system. An inter-RAT bearer change is attempted to change the bearer to the 2G system. A parameter set 221 for the 4G system has four parameters, the TI, the R99 QoS, the LLC SAPI, and the radio priority, all being optional. To transfer the bearer to the 2G system, parameter set 222 for the 2G system requires all four parameters the TI, the R99 QoS, the LLC SAPI, and the radio priority to be mandatory. Therefore, in the inter-RAT bearer change procedure, the UE may detect missing parameters/missing IEs if 4G parameter set 221 does not include any one of the optional parameters of the TI, the R99 QoS, the LLC SAPI, and the radio priority. If the missing parameter is detected, a bearer preservation procedure is performed to keep the bearer continuity.

In a third scenario, the UE successfully transfers the bearer from the 4G system to the 3G system with the 4G parameter set 231 having both the TI and the R99 QoS as required by the 3G parameter set 232. Parameter set 231 may not include one or both of the optional parameters of the LLC SAPI, and the radio priority. Therefore, the transferred bearer may not include one or both of the optional parameters of the LLC SAPI, and the radio priority. Subsequently, the UE performs inter-RAT change from the 3G system to the 2G system in an idle state, which has a 2G parameter set of 233 requiring all four parameters, the TI, the R99 QoS, the LLC SAPI, and the radio priority, as mandatory. In one novel aspect, upon detecting missing one or both the optional parameters/IEs of the LLC SAPI, and the radio priority, the UE performs the bearer preservation procedure. In another novel aspect, upon detecting missing one or both the optional parameters/IEs of the LLC SAPI, and the radio priority, the UE performs the bearer termination procedure.

In one novel aspect, upon detecting missing mandatory parameters during inter-RAT bearer change, the UE performs the bearer preservation procedure. In one embodiment, predefined/preconfigured parameter settings are used. In another embodiment, the missing parameters are obtained from the network. In yet another embodiment, signaling procedures are modified/designed to obtain the missing parameters. The following figures further illustrates in details of different embodiments of the bearer preservation procedure.

Figure 3:
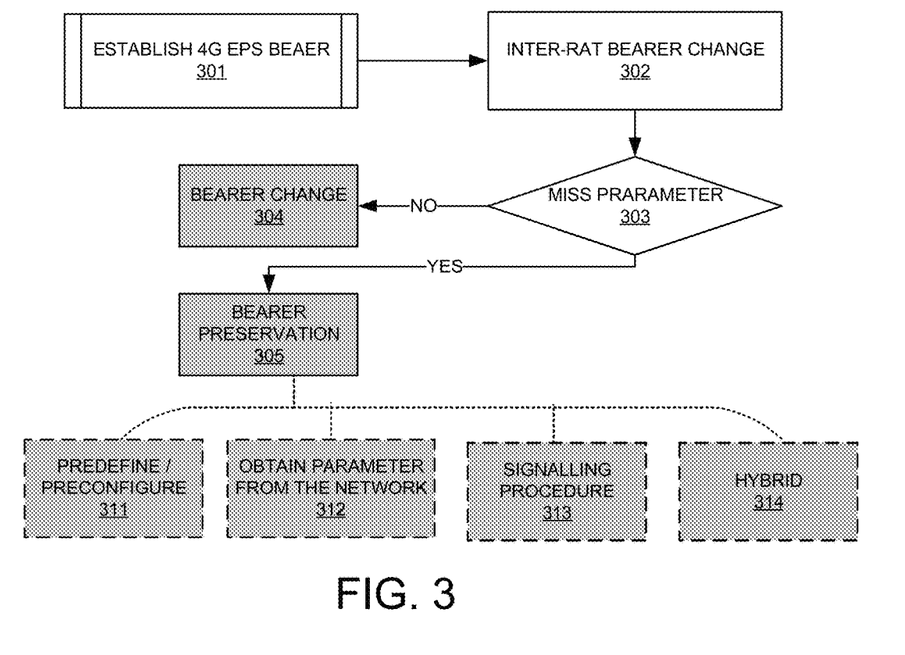
FIG. 3 illustrates an exemplary flow diagram for the top-level bearer preservation procedure for inter-RAT bearer change in accordance with embodiments of the current invention.

FIG. 3 illustrates an exemplary flow diagram for the top-level bearer preservation procedure for inter-RAT bearer change in accordance with embodiments of the current invention. At step 301, the UE establishes the 4G EPS bearer. At step 302, the UE prepares the inter-RAT bearer change. At step 303, the UE determines whether there are missing mandatory parameters for the inter-RAT bearer change. If step 303 determines no, the UE moves to step 304 and performs the bearer change. If step 303 determines yes, the UE moves to step 305 and performs a bearer preservation procedure. The bearer preservation procedure includes a predefined/preconfigured mandatory parameters procedure 311, an obtain-parameters from the network procedure 312, a signaling procedure 313, and a hybrid procedure 314. There are different embodiments of the different procedures.

Figure 4:
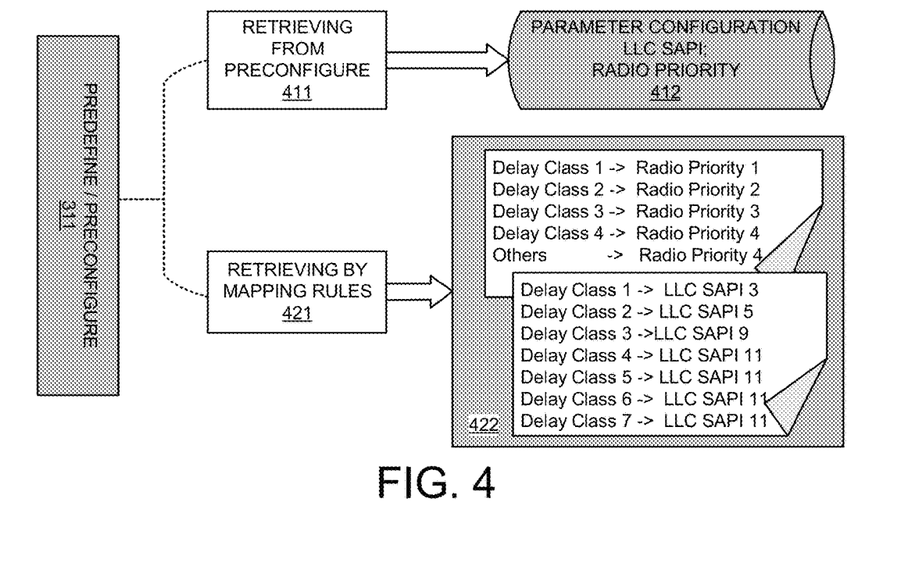
FIG. 4 illustrates an exemplary flow diagram for different embodiments of the predefined/preconfigured procedure in accordance with embodiments of the current invention.

FIG. 4 illustrates an exemplary flow diagram for different embodiments of the predefined/preconfigured procedure 311 in accordance with embodiments of the current invention. In one embodiment, the UE and the network can apply a preconfigured parameter setting in the 4G or 3G network. At step 411, the UE attempts to retrieve parameters locally through a database 412 upon detecting one or more missing parameters during the inter-RAT bearer change. For example, when the UE changes to a 2G system in an idle state, it detects the LLC SAPI is not presented or the LLC SAPI is set to be "LLC SAPI not assigned." The UE can access preconfigured/predefined database 412 and retrieves the preconfigured value for the LLC SAPI such the new bearer can be established. Similarly, if the radio priority parameter is not presented, the UE retrieves the preconfigured/predefined radio priority value from database 412.

In a different embodiment, the missing parameter is dynamically mapped based on other parameters available. At step 421, the UE upon detecting missing one or more mandatory parameters, retrieves such parameters using predefined/preconfigured mapping rules 422. For example, rule 422 includes mapping rules for LLC SAPI and radio priority. The UE upon determining that one or both of the parameters of LLC SAPI and radio priority are missing, the UE obtains a known parameter, such as the delay class first. The UE subsequently uses mapping rules 422 to retrieve the missing parameters. For example, a mapping table for the delay class the LLC SAPI is preconfigured in 422. The UE first determines its current configured delay class. The UE subsequently uses the mapping table to get the LLC SAPI value based on the delay class. Similarly, the UE can get the radio priority value by using the mapping table of the delay class and the radio priority. Using the mapping rule procedure, the UE can get the most updated parameter based on its latest known parameters. Other mapping table based on other known parameters can be used. The mapping table itself can be preconfigured/predefined and can be updated dynamically through system signaling or other means.

Figure 5:
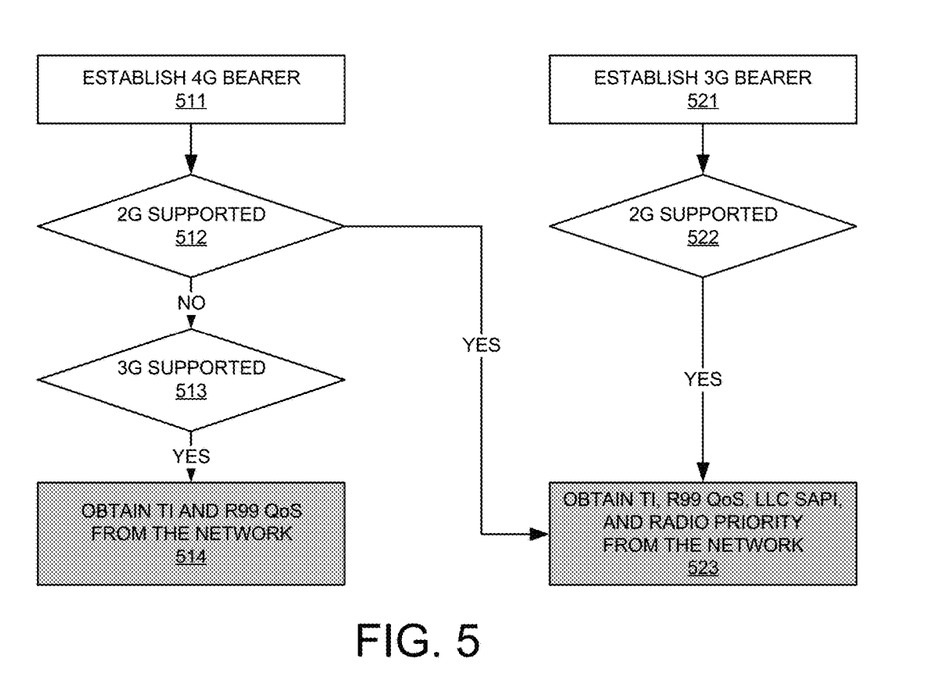
FIG. 5 shows an exemplary diagram for multiple wireless communications devices to send the corresponding responding frames concurrently over more than one transmission instances and at least one transmission instance has less than the maximum allowed wireless communications devices in accordance with embodiments of the current invention.

In another embodiment, the missing parameters can be obtained through provisioning from the network. FIG. 5 illustrates obtaining missing parameters from network provisioning. For example, in the 4G system, the parameters the TI, the R99 QoS, the LLC SAPI, and the radio priority, should be conditionally provided if the operator/PLMN also supports the 2G system. Similarly, the parameters TI, the R99 QoS, should be conditionally provided if the operator PLMN also supports the 3G system. In another example, in the 3G system, if the 2G system is also supported, the parameters of the LLC SAPI, and the radio priority, should be conditionally provided. At step 511, the UE establishes the 4G EPS bearer. At step 512, the UE checks if the 3GPP network also supported the 2G network. If step 512 determines yes, the UE obtains conditionally configured parameters of the TI, the R99 QoS, the LLC SAPI, and the radio priority from the network. If step 512 determines no, the UE moves to step 513 and determines if the 3G system is also supported. If step 513 determines yes, the UE obtains conditionally configured parameters of the TI and the R99 QoS, from the network. Otherwise, there is no additional parameter needed.

Similarly, at step 521, the UE establishes the 3G PDP context. At step 522, the UE checks if the 3GPP network also supported the 2G network. If step 512 determines yes, the UE obtains conditionally configured parameters of the TI, the R99 QoS, the LLC SAPI, and the radio priority from the network. Otherwise, there is no additional parameter needed.

In other embodiments, signaling procedures are used for bearer preservation procedures including Service Request based solution, MS-initiated PDP Context Modification Procedure/UE Requested Bearer Resource Modification Procedure, and the Routing Area Update procedure based solution.

Figure 6:
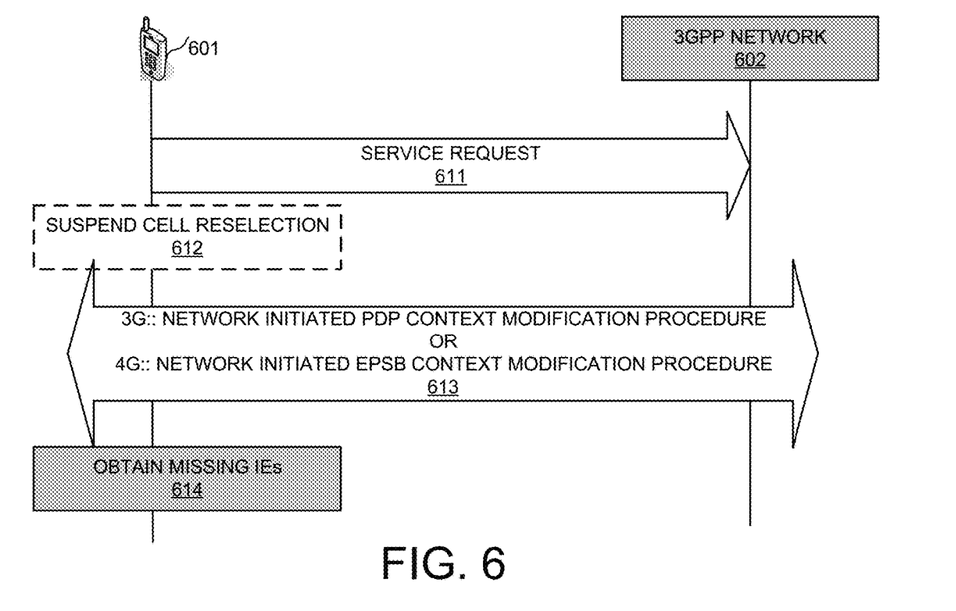
FIG. 6 illustrates an exemplary flow diagram of the Service Request based solution in accordance with embodiments of the current invention.

FIG. 6 illustrates an exemplary flow diagram of the Service Request based solution in accordance with embodiments of the current invention. A UE 601 is connected with a 3GPP network 602. In 3G RAT, UE 601 can try to send SERVICE REQUEST (service type=Data) to hint the network to trigger network initiated allocation of the 2G parameters, such as the LLC SAPI value and the Radio Priority value, assigned to the UE. In 4G RAT, UE 601 can try to send SERVICE REQUEST with additional EPS bearer context status parameters to hint the network to trigger network initiated allocation of 3G or 2G parameters, such as the LLC SAPI value and the Radio Priority value, assigned to the UE. The SERVICE REQUEST message can be sent before cell reselection procedure. In one embodiment, the SERVICE REQUEST message can be triggered based on the type of the cell-reselection, including intra-frequency, inter-frequency and inter-RAT. In one embodiment, the Service-Request based solution is triggered upon detecting the inter-RAT cell reselection, while not for other types of the cell reselection. In yet another embodiment, after sending the SERVICE REQUEST message, the UE may suspend the cell reselection procedure and wait for the network allocated parameter for a period before performing the cell reselection.

As shown in FIG. 6, at step 611, UE 601 sends a SERVICE REQUEST to 3GPP network 602. At step 612, UE 601 suspends the cell reselection procedure for a period such the network allocated parameters can be retrieved. At step 613, the UE performs the network initiated PDP Context Modification Procedure if the bearer is in the 3G RAT. If the bearer is in the 4G RAT, UE 601 performs the network initiated EPS bearer Context Modification Procedure. At step 614, UE 601 obtains the missing mandatory parameters/IEs from the network.

In other embodiments, UE Requested Bearer Resource Modification Procedure based solution for 4G RAT, or MS-initiated PDP Context Modification Procedure based solution for 3G RAT are used to retrieve missing parameters. In 4G RAT, the UE can trigger the "UE Requested Bearer Resource Modification Procedure" to trigger the network to assign valid parameters (e.g., LLC SAPI value and Radio Priority value) in the "MODIFY EPS BEARER CONTEXT REQUEST (Network to MS direction)" message. In 2G or 3G RAT, the UE can trigger the "MS-Initiated PDP Context Modification Procedure" to trigger the network to assign valid parameters (e.g., LLC SAPI value and Radio Priority value) in the "MODIFY PDP CONTEXT ACCEPT (Network to MS direction)" message. In 2G/3G/4G RAT, it can be specified that the network sends the "MODIFY PDP CONTEXT REQUEST (Network to MS direction)" or "MODIFY EPS BEARER CONTEXT REQUEST" messages for parameters allocation. In one embodiment, bearer modification procedures can be triggered before cell reselection procedure. In other embodiments, after triggering the bearer modification procedures, the UE may suspend the cell reselection procedure and wait for the network allocated parameter for a period before performing the cell reselection.

Figure 7A:
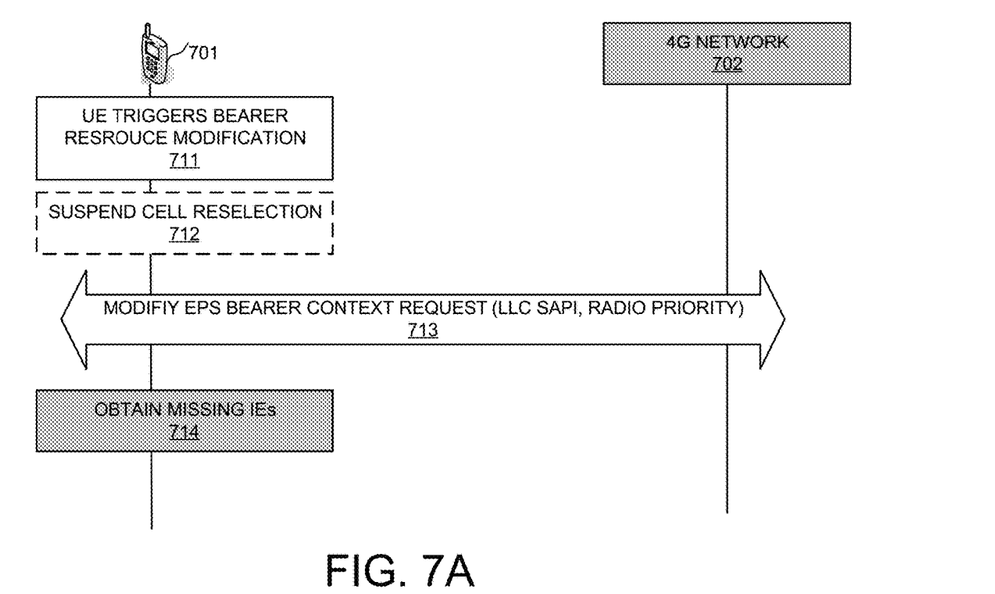
FIG. 7A illustrates UE Requested Bearer Resource Modification Procedure based solution in accordance with embodiments of the current invention.

FIG. 7A illustrates UE Requested Bearer Resource Modification Procedure based solution in accordance with embodiments of the current invention. UE 701 connects with 4G network 702. At step 711, UE 701 triggers Bearer Resource Modification procedure. In one embodiment, at step 712, UE 701 suspends the cell reselection procedure such that the missing parameters are obtained. At step 713, UE 701 receives Modify EPS Bearer Context Request from 4G network 702 with parameters, such as LLC SAPI and Radio Priority. At step 714, UE 701 obtains the one or more missing parameters/IEs.

Figure 7B:
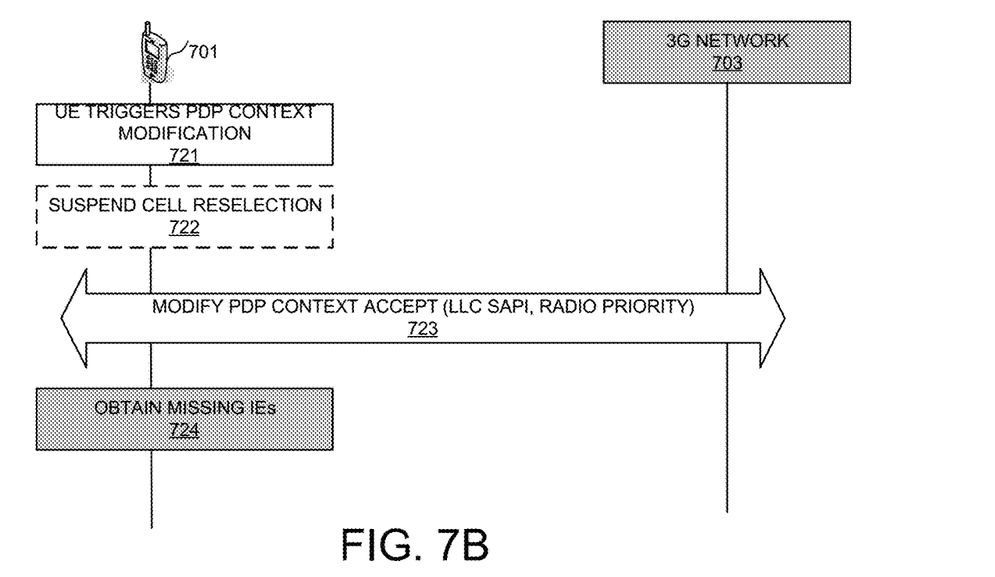
FIG. 7B illustrates MS-initiated PDP Context Modification Procedure based solution in accordance with embodiments of the current invention.

FIG. 7B illustrates MS-initiated PDP Context Modification Procedure based solution in accordance with embodiments of the current invention. UE 701 connects with 3G network 703. At step 721, UE 701 triggers PDP Context Modification procedure. In one embodiment, at step 722, UE 701 suspends the cell reselection procedure such that the missing parameters are obtained. At step 723, UE 701 receives Modify PDP Context Accept from the 3G network 703 with parameters, such as LLC SAPI and Radio Priority. At step 714, UE 701 obtains the one or more missing parameters/IEs.

In other embodiments, RAU based solution are used to enable bearer continuity during inter-RAT bearer change. Upon system change to 2G from 3G, the UE detects that it does not have valid LLC SAPI value (including the LLC SAPI is "LLC SAPI not assigned") or the 2G Radio Priority value for the specific PDP context. In one embodiment, RAU process is used to retrieve the missing mandatory parameters/IEs. Different embodiments of the RAU based solution can be used and are illustrated below.

Figure 8A:
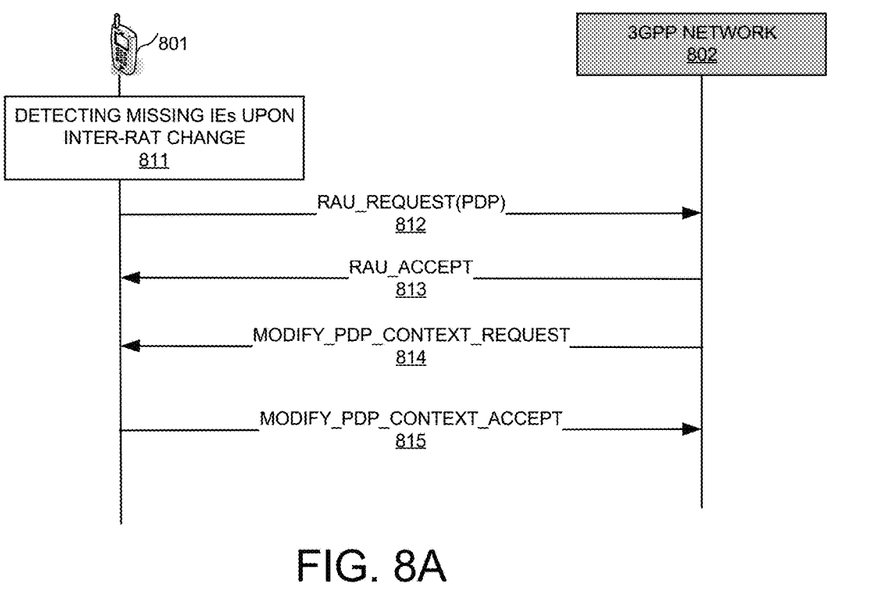
FIG. 8A illustrates the first RAU based solution in accordance with embodiments of the current invention.

FIG. 8A illustrates the first RAU based solution in accordance with embodiments of the current invention. A UE 801 connects with a 3GPP network 802. At step 811, UE 901 detects missing parameters/IEs during inter-RAT bearer change. At step 812, UE 801 sends RAU REQUEST to network 802 indicating the existence of the specific PDP context. At step 813, network 802 replies with an RAU_ACCEPT message for acknowledgement. At step 814, network 802 initiates a MODIFY_PDP_CONTEXT_REQUEST with a proper LLC SAPI value and a Radio Priority assigned to the specific PDP context. At step 815, UE 801 replies a MODIFY_PDP_CONTEXT_ACCEPT for confirmation.

Figure 8B:
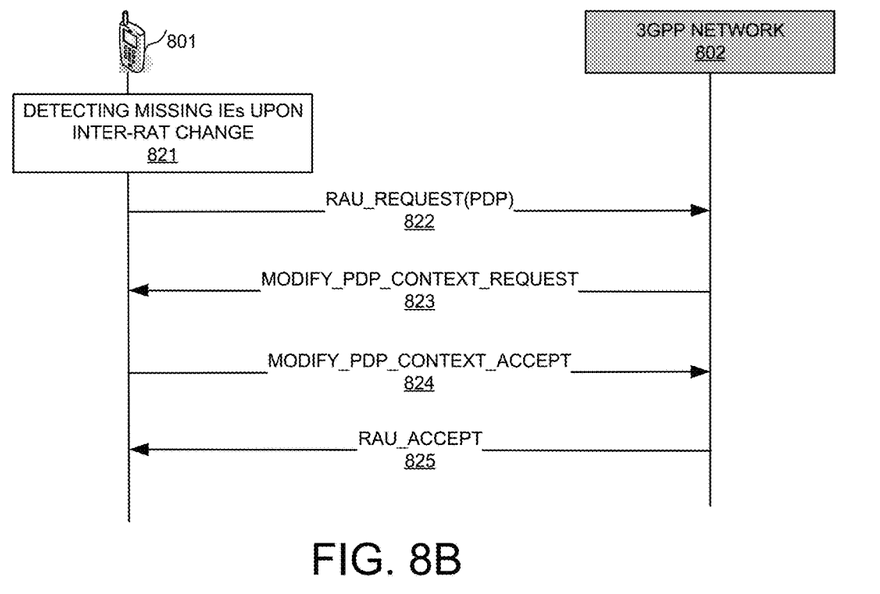
FIG. 8B illustrates the second RAU based solution in accordance with embodiments of the current invention.

FIG. 8B illustrates the second RAU based solution in accordance with embodiments of the current invention. The second RAU based solution is a variation of the first RAU based solution. It covers different message sequence of the method. A UE 801 connects with a 3GPP network 802. At step 811, UE 901 detects missing parameters/IEs during inter-RAT bearer change. At step 812, UE 801 sends RAU REQUEST to network 802 indicating the existence of the specific PDP context. At step 813, network 802 initiates a MODIFY_PDP_CONTEXT_REQUEST with a proper LLC SAPI value and a Radio Priority assigned to the specific PDP context. At step 814, UE 801 replies a MODIFY_PDP_CONTEXT_ACCEPT for confirmation. At step 815, network 802 replies with an RAU_ACCEPT message for acknowledgement.

In other embodiment using bearer preservation procedures, hybrid solutions can be used by mixing different solutions mentioned above, including the predefined/pre-configured parameter settings, the network provisioning solution, the service request based solution, the MS-initiated signaling solution and the RAU based solution. The hybrid solution may use the combination of a plurality of the above solutions to obtain the missing parameter(s). It can use different solutions for different parameters, or use different solutions based on different triggering events or during different conditions. For example, some mandatory parameters are provisioned from the network while the other mandatory parameters are obtained by the pre-defined mapping rule. In another example, some mandatory parameters are obtained by the pre-configured values while the other mandatory parameters are obtained by the pre-defined mapping rule. Other combinations of the hybrid solution are supported to optimize further the performance or efficiency of the network.

Figure 9:
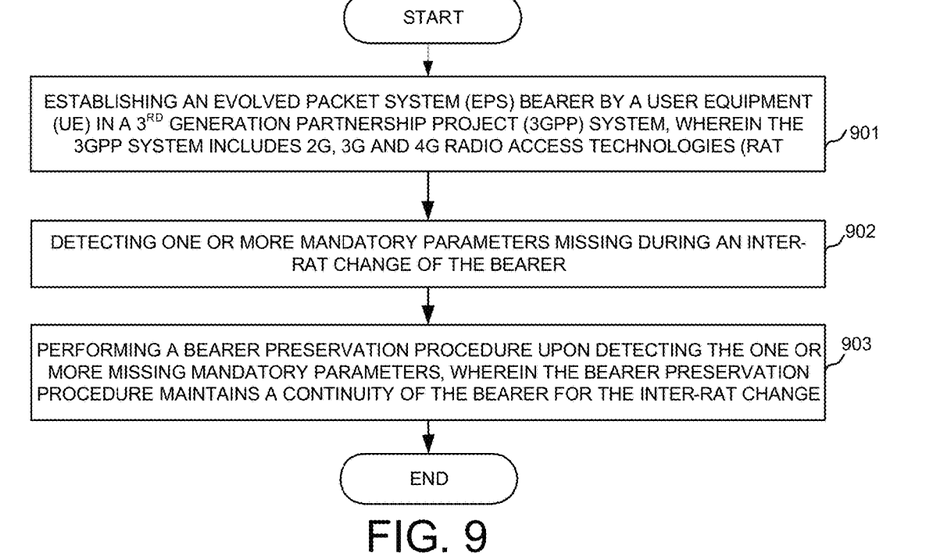
FIG. 9 illustrates an exemplary flow chart for the bearer preservation procedures during inter-RAT bearer change in accordance with embodiments of the current inventions.

FIG. 9 illustrates an exemplary flow chart for the bearer preservation procedures during inter-RAT bearer change in accordance with embodiments of the current inventions. At step 901, the UE establishes an EPS bearer in a 3GPP system, wherein the 3GPP system includes 2G, 3G, and 4G RAT. At step 902, the UE detects one or more mandatory parameters missing during an inter-RAT change of the bearer. At step 903, the UE performs a bearer preservation procedure upon detecting the one or more missing mandatory parameters, wherein the bearer preservation procedure maintains a continuity of the bearer for the inter-RAT change.

In another novel aspect, the UE performs a bearer termination upon detecting one or more predefined/preconfigured conditions. In one embodiment, the UE established the 4G EPS bearer. The UE successfully performs a bearer change from 4G to 3G. Subsequently, the UE detects missing mandatory parameters during inter-RAT bearer change from 3G to 2G. The UE performs bearer termination by releasing the PDP context.

Figure 10:
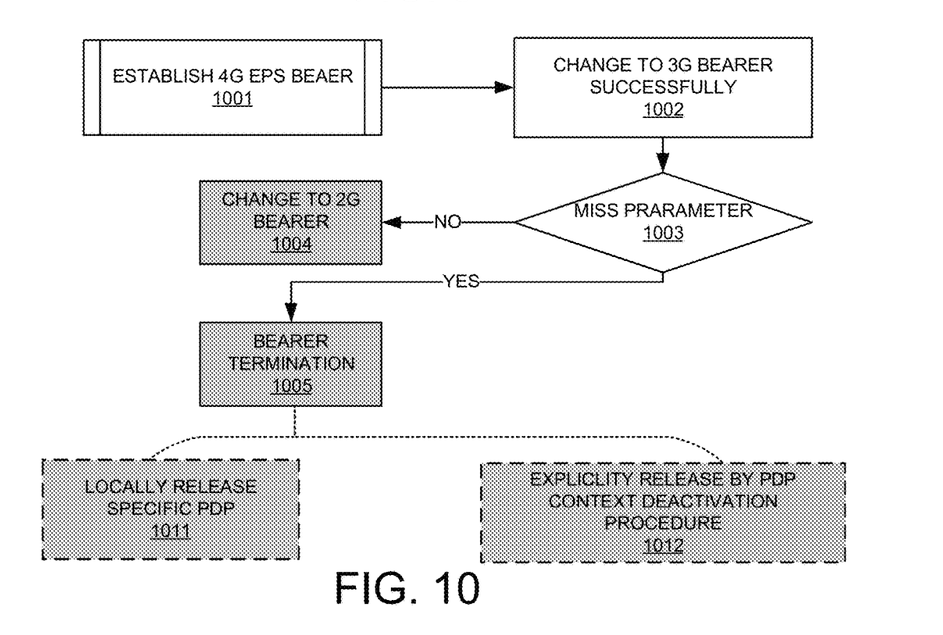
FIG. 10 illustrates an exemplary diagram of the bearer termination solution for inter-RAT bearer change in accordance with embodiments of the current invention.

FIG. 10 illustrates an exemplary diagram of the bearer termination solution for inter-RAT bearer change in accordance with embodiments of the current invention. At step 1001, the UE establishes the 4G EPS bearer. At step 1002, the UE changes to 3G bearer successfully. At step 1003, the UE determines if there are missing mandatory parameters in preparation to change to the 2G bearer. If step 1003 determines no, the UE moves to step 1004 and changes to 2G bearer. If step 1003 determines yes, the UE moves to step 1005 and performs bearer termination procedure. In some embodiments, the UE terminates the bearer using locally releasing of the specific 3G PDP context at step 1011. In other embodiments, the UE explicitly releases bearer using the PDP context deactivation procedure at step 1012.

In one embodiment, the locally releasing procedure can be initiated by the UE. In other embodiments, the locally releasing procedure is initiated by the network or by both the network and the UE. In one embodiment, the locally releasing procedure involves locally clearing of corresponding context of the bearer. For example, internal entities of the UE, such as the session management layer (SM), the sub-network dependent convergence protocol (SNDCP), the logic link control layer (LLC), the radio link control layer (RLC) and the radio access bearer manager (RABM), will start to clear the corresponding context for the bearer/PDP context. In another embodiment, if the UE is in the "LLC ACK mode," the LLC layer needs to negotiate with the network to finish the local release procedure. Other internal releasing procedure can be employed to release the PDP context locally upon detecting the missing of mandatory parameters/IEs. After locally releasing the PDP context, the UE may notify the operating system, such as the Android, about the PDP context release event. Subsequently, the OS will determine whether it needs to re-establish the PDP context. At the same time, the modem/network may try to synchronize with the PDP context status upon detecting one or more triggering events. The triggering events includes, the Mobility Management layer (MM) triggers RAU/TAU (Tracking Area Update) procedure to sync up PDP context information with the network; MO or MT detach procedure; User/operating system re-establishes the PDP context by using the same NSAPI/TI values. The network should accept the new setup PDP context and release the old one. In another embodiment, the network actively release the PDP context by triggering MT deactivate or MT modify procedure for the PDP context just been released.

In other embodiments, the explicitly releases bearer procedure can be initiated by the UE, or by the network, or by both the UE and the network. The standard PDP context deactivation procedures are followed.

Figure 11:
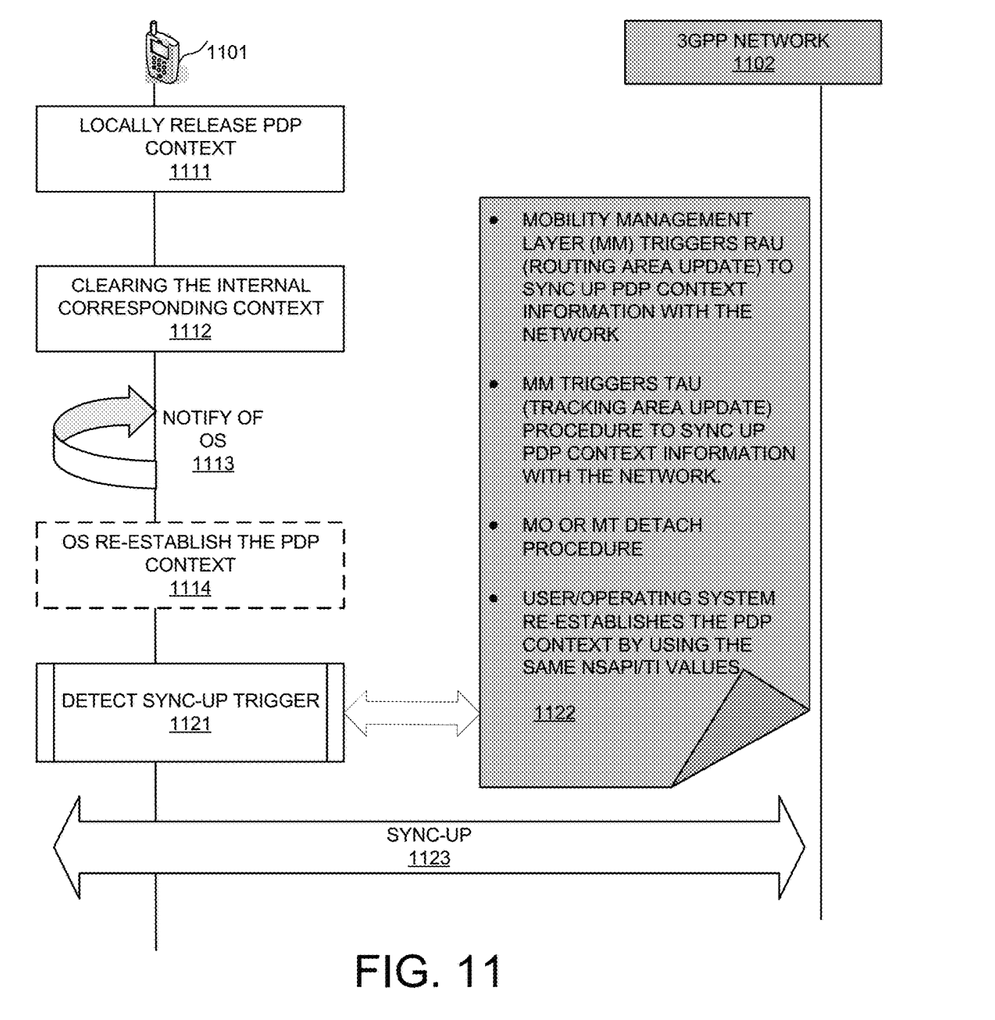
FIG. 11 illustrates an exemplary flow chart of the local release procedure for the inter-RAT bearer change in accordance with embodiments of the current invention.

FIG. 11 illustrates an exemplary flow chart of the local release procedure for the inter-RAT bearer change in accordance with embodiments of the current invention. A UE 1101 is connected with a 3GPP network 1102. At step 1111, UE 1101 locally releases the PDP context. At step 1112, UE 1101 clears the internal corresponding context with each internal modules, such as the SM, the SNDCP, the LLC, the RLC, and the RABM. At step 1113, upon completing the local PDP context release, UE 1101 notifies the operating system (OS). Optionally at step 1114, the OS determines whether to re-establish the PDP context. At step 1121, UE 1101 monitors sync-up triggering events. The sync-up triggering events includes predefined conditions in 1122. At step 1123, upon detecting one or more sync-up triggering events, UE 1101 performs sync-up procedure with 3GPP network 1102.

Figure 12:
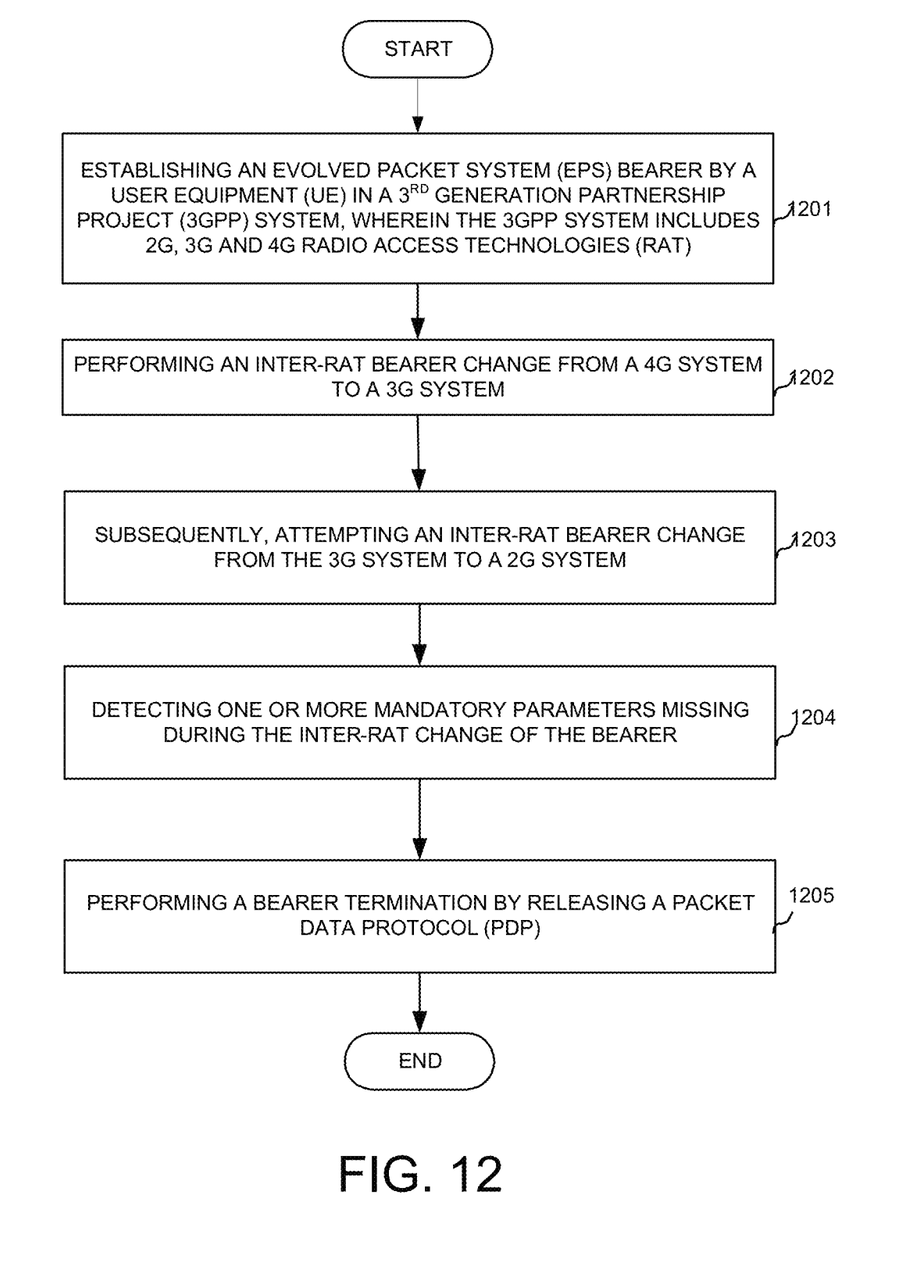
FIG. 12 illustrates an exemplary flow chart for the bearer termination procedures during inter-RAT bearer change in accordance with embodiments of the current inventions.

FIG. 12 illustrates an exemplary flow chart for the bearer termination procedures during inter-RAT bearer change in accordance with embodiments of the current inventions. At step 1201, the UE establishes an EPS bearer, wherein the 3GPP system includes 2G, 3G, and 4G RAT. At step 1202, the UE performs an inter-RAT bearer change from a 4G system to a 3G system. At step 1203, the UE subsequently, attempts an inter-RAT bearer change from the 3G system to a 2G system in an idle state. At step 1204, the UE detects one or more mandatory parameters missing during the inter-RAT change of the bearer. At step 1205, the UE performs a bearer termination by releasing a Packet Data Protocol (PDP) context.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   establishing an Evolved Packet System (EPS) bearer by a user equipment (UE) in a $3^{rd}$ Generation Partnership Project (3GPP) system, wherein the 3GPP system includes 2G, 3G and 4G radio access technologies (RAT);
   detecting one or more mandatory parameters missing during an inter-RAT change of the bearer in an idle state;
   performing a bearer preservation procedure in the idle upon detecting the one or more missing mandatory parameters, wherein the bearer preservation procedure sets up corresponding values for the one or more missing mandatory parameters and maintains a continuity of the bearer for the inter-RAT change.

2. The method of claim 1, wherein the bearer preservation procedure involves: pre-defining parameter settings for the one or more mandatory parameters.

3. The method of claim 2, wherein the predefined parameter settings are preconfigured and stored in the UE.

4. The method of claim 2, wherein the predefined values are dynamically mapped from corresponding available parameters.

5. The method of claim 1, wherein the bearer preservation procedure involves:
   receiving one or more configuration messages from the wireless network; and
   retrieving the predefined parameter settings from the received one or more configuration messages.

6. The method of claim 1, wherein the bearer preservation procedure involves: initiating a signaling procedure to the wireless network to obtain the mandatory parameters.

7. The method of claim 6, wherein the signaling procedure is sending a SERVICE REQUEST message with an indicator of mandatory parameter request.

8. The method of claim 6, wherein the signaling procedure is initiating PDP context a Packet Data Protocol (PDP) Context Modification Procedure.

9. The method of claim 6, wherein the signaling procedure is initiated before an inter-RAT cell reselection procedure.

10. The method of claim 9, further comprising: suspending the cell reselection procedure for a predefined period such that the one or more mandatory parameters are retrieved before the start of the cell reselection procedure.

11. The method of claim 1, wherein the bearer preservation procedure involves initiating a Routing Area Update (RAU) procedure indicating the need for the one or more mandatory parameters after an inter-RAT cell reselection.

12. An apparatus, comprising:
   a transceiver that transmits and receives radio signals via a radio access link;
   an evolved packet system (EPS) bearer handler that establishes a 4G bearer connection in a $3^{rd}$ Generation Partnership Project (3GPP) system, wherein the 3GPP system includes 2G, 3G and 4G radio access technologies (RAT);
   a mandatory parameter handler that determines whether one or more mandatory parameters are missing for an inter-RAT change of bearer in the idle state; and
   a bearer preservation handler that sets up corresponding values for the one or more missing mandatory parameters and maintains the bearer continuity of the bearer for the inter-RAT change of bearer in the idle state.

13. The apparatus of claim 12, wherein the preservation handler maintains the bearer continuity by predefining or preconfiguring parameter settings for the one or more mandatory parameters.

14. The apparatus of claim 12, wherein the preservation handler receives one or more configuration messages from a network entity of the 3GPP system and retrieves the predefined parameter settings from the received one or more configuration messages.

15. The apparatus of claim 12, wherein the preservation handler initiates a signaling procedure to the wireless network to obtain the mandatory parameters.

16. The apparatus of claim 15, wherein the signaling procedure is sending a SERVICE REQUEST message with an indicator of mandatory parameter request.

17. The apparatus of claim 15, wherein the signaling procedure is initiating a Packet Data Protocol (PDP) Context Modification Procedure.

18. The apparatus of claim 15, wherein the signaling procedure is initiated before an inter-RAT cell reselection procedure.

19. The apparatus of claim 18, the preservation handler suspends the cell reselection procedure for a predefined period such that the one or more mandatory parameters are retrieved before the start of the cell reselection procedure.

20. The apparatus of claim 12, wherein the preservation handler initiates a Routing Area Update (RAU) procedure indicating the need for the one or more mandatory parameters after an inter-RAT cell reselection.

* * * * *